United States Patent
Lee

(10) Patent No.: US 10,280,876 B2
(45) Date of Patent: May 7, 2019

(54) EJECTOR FOR VAPORIZED FUEL GAS RECIRCULATION DEVICES

(71) Applicant: HYUNDAI KEFICO CORPORATION, Gunpo, Gyeonggi-do (KR)

(72) Inventor: Ahn Hee Lee, Incheon (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 0 days.

(21) Appl. No.: 15/840,524

(22) Filed: Dec. 13, 2017

(65) Prior Publication Data
US 2018/0187633 A1 Jul. 5, 2018

(30) Foreign Application Priority Data
Dec. 29, 2016 (KR) .................. 10-2016-0181963

(51) Int. Cl.
*F02M 25/08* (2006.01)
*F04D 27/02* (2006.01)
(Continued)

(52) U.S. Cl.
CPC ...... *F02M 25/0836* (2013.01); *F02M 25/089* (2013.01); *F04D 27/0215* (2013.01);
(Continued)

(58) Field of Classification Search
CPC ........... F02M 25/0835; F02M 25/0872; F02M 25/089; F16K 15/181; F04D 27/0215;
(Continued)

(56) References Cited

U.S. PATENT DOCUMENTS 3,716,307 A * 2/1973 Hansen ................. B66C 1/0218
248/362
3,996,748 A * 12/1976 Melchior .............. F02B 37/166
60/614
(Continued)

FOREIGN PATENT DOCUMENTS

CN 205349565 U * 6/2016
DE 102011105891 A1 12/2012
(Continued)

OTHER PUBLICATIONS

Primetech, Air Jet Eductor E400 Series, 2017 <http://primetechejectors.com/air_jet_eductor.htm>.*

*Primary Examiner* — John M Zaleskas
(74) *Attorney, Agent, or Firm* — Mintz Levin Cohn Ferris Glovsky and Popeo, P.C.; Kongsik Kim; Jhongwoo Jay Peck

(57) ABSTRACT

An ejector for vaporized fuel gas recirculation devices is provided. The ejector for vaporized fuel gas recirculation devices reduces the number of elements equipped in a vehicle and an ejector mounting angle is adjusted to be suitable for a layout environment of the vehicle. Accordingly, a mounting cavity of the vehicle is more efficiently designed. When an intake pressure of an intake manifold is reduced a base component is moved in a direction toward a first nozzle component, and a region of the base component except an aperture closes the first nozzle component.

12 Claims, 8 Drawing Sheets

(51) Int. Cl.
  *F16K 15/18* (2006.01)
  *F16K 15/02* (2006.01)
  *F04F 5/16* (2006.01)
  *F04F 5/46* (2006.01)
  *F02D 41/00* (2006.01)

(52) U.S. Cl.
  CPC .............. *F04F 5/16* (2013.01); *F04F 5/46* (2013.01); *F16K 15/023* (2013.01); *F16K 15/181* (2013.01); *F02D 41/004* (2013.01); *F05D 2220/40* (2013.01)

(58) Field of Classification Search
  CPC ........ B60K 15/03504; B60K 15/03519; B60K 2015/0325
  USPC ......................................... 123/516, 518–520
  See application file for complete search history.

(56) References Cited

U.S. PATENT DOCUMENTS

| | | | |
|---|---|---|---|
| 4,380,418 A * | 4/1983 | Crawford | F04F 5/54 123/389 |
| 4,557,226 A * | 12/1985 | Mayer | F01M 13/00 123/41.86 |
| 4,693,085 A * | 9/1987 | Sumser | F02B 33/446 417/89 |
| 4,781,537 A * | 11/1988 | Nicodemus | F04F 5/12 239/443 |
| 5,005,550 A * | 4/1991 | Bugin, Jr. | F02M 25/089 123/520 |
| 5,669,361 A * | 9/1997 | Weissinger | B60K 15/03519 123/520 |
| 8,770,176 B2 | 7/2014 | Kulkarni et al. | |
| 9,086,036 B2 | 7/2015 | Inoguchi et al. | |
| 9,885,323 B1 | 2/2018 | Myers et al. | |
| 2005/0133097 A1 | 6/2005 | Mitani et al. | |
| 2008/0103667 A1 * | 5/2008 | Suzuki | B60T 17/02 701/70 |
| 2011/0186151 A1 * | 8/2011 | Sparazynski | B60T 17/02 137/526 |
| 2012/0318244 A1 * | 12/2012 | Williams | F02M 25/089 123/520 |
| 2013/0008413 A1 * | 1/2013 | Inoguchi | F02M 25/0836 123/518 |
| 2013/0019844 A1 * | 1/2013 | Kulkarni | B60K 15/03504 123/520 |
| 2013/0152904 A1 * | 6/2013 | Balsdon | F02M 25/0836 123/518 |
| 2014/0134007 A1 | 5/2014 | Koith et al. | |
| 2014/0373953 A1 * | 12/2014 | Spanevello | F16K 15/148 137/854 |
| 2015/0136091 A1 * | 5/2015 | Ryu | F02M 37/025 123/495 |
| 2015/0159665 A1 | 6/2015 | Fletcher et al. | |
| 2015/0176542 A1 * | 6/2015 | Balsdon | F02M 25/0836 137/888 |
| 2015/0369259 A1 * | 12/2015 | Park | F04F 5/24 137/544 |
| 2016/0177892 A1 * | 6/2016 | Heinrich | F02M 25/0836 123/564 |
| 2016/0377038 A1 * | 12/2016 | Bittner | F02M 25/0836 123/533 |

FOREIGN PATENT DOCUMENTS

| | | | | |
|---|---|---|---|---|
| DE | 102012009858 A1 * | 11/2013 | ............ | F16K 15/148 |
| DE | 102016005468 A1 | 12/2016 | | |
| GB | 2129516 A * | 5/1984 | ............. | B60T 13/52 |
| JP | 2013-015106 A | 1/2013 | | |
| JP | 2013-174143 A | 9/2013 | | |
| JP | 2013-245568 A | 12/2013 | | |
| JP | 2014111915 A * | 6/2014 | | |
| JP | 2014111915 A | 6/2014 | | |
| KR | 20110049057 A | 5/2011 | | |
| KR | 10-2014-0056270 A | 5/2014 | | |
| KR | 10-2016-0097222 A | 8/2016 | | |

\* cited by examiner

EJECTOR FOR VAPORIZED FUEL GAS RECIRCULATION DEVICES

CROSS-REFERENCE TO RELATED APPLICATIONS

This application claims priority to Korean Patent Application No. 10-2016-0181963, filed on Dec. 29, 2016, the disclosure of which is incorporated herein by reference in its entirety.

TECHNICAL FIELD

The present disclosure relates to an ejector, and more particularly, to an ejector for vaporized fuel gas recirculation devices, that reduces the number of elements equipped in a vehicle, and an ejector mounting angle that is adjusted to be suitable for a layout environment of the vehicle, thereby enabling a mounting cavity of the vehicle to be more efficiently designed.

RELATED ART

Generally, a vaporized fuel gas occurs in a fuel tank of a vehicle due to several causes, and when the vaporized fuel gas is emitted to the air as-is, the air is polluted by the vaporized fuel gas. Therefore, a vaporized gas control device for allowing a vaporized fuel gas to be combusted in an engine is included in vehicles. For example, the vaporized fuel gas flows into a canister including activated carbon along with air flowing in via an air cleaner and is accumulated into the canister. The accumulated vaporized fuel gas flows from the canister into a purge control solenoid valve (PCSV). Moreover, when the PCSV operates according to an electronic control unit (ECU) signal, the vaporized fuel gas is supplied to a surge tank and is transferred to a combustion chamber. Therefore, a noxious gas is prevented from being emitted to the air.

In the PCSV of the related art, an input nipple coupled to a supply pipe extending from the canister is disposed on a first side of a case, and an output nipple for emitting the vaporized fuel gas to an intake manifold is provided on a second side. The PCSV operates by using the principle of an electromagnet. Based on control by an ECU, when power is supplied to the PCSV, a solenoid valve is opened, and when the supply of the power is cut off, the solenoid valve is closed by a spring connected to the solenoid valve.

Moreover, the intake manifold is disposed between the surge tank and the PCSV. Therefore, a super pressure greater than a valve spring force of the PCSV is provided in the intake manifold by a turbocharger. Accordingly, the internal air of the intake manifold reversely flows to the canister causing an increase in pressure of the canister. In order to solve such a problem, a separate check valve is added between the intake manifold and the PCSV, to prevent the reverse flow caused by the supper pressure.

In an engine in a low speed operating region, due to an action of an intake pressure in the intake manifold the vaporized fuel gas collected into the canister can normally flow into the intake manifold. Conversely, when the engine equipped with the turbocharger operates at a high speed, the intake pressure in the intake manifold is reduced. Accordingly, the vaporized fuel gas collected into the canister cannot flow into the intake manifold. Therefore, an ejector which is a separate vacuum supply source is required. The ejector generates a vacuum in a boosting state or when an intake manifold vacuum is supplied. However, in the engine w when an intake manifold pressure is greater than an atmospheric pressure and a boosting pressure occurs, the intake manifold vacuum is replaced with a vacuum from the ejector or may increase.

In the ejector of the related art, a path that supplies a vacuum is provided as one body with a connector coupled to the path. Therefore, a coupling angle of each of elements including the path coupled to the ejector is limited, and an engine compartment mounting layout of the ejector has substantial limitations. Furthermore, as described above, since each of the check valve and the ejector are separately provided, the number of elements increases, and an assembly time of a product increases. Accordingly, productivity is reduced, the manufacturing cost increases, and there is a limitation in efficiently designing a cavity of an engine compartment.

The above information disclosed in this section is merely for enhancement of understanding of the background of the disclosure and therefore it may contain information that does not form the prior art that is already known in this country to a person of ordinary skill in the art.

SUMMARY

The present disclosure provides an ejector for vaporized fuel gas recirculation devices, in which the number of elements equipped in a vehicle is reduced, and an ejector mounting angle is adjusted to be suitable for a layout environment of the vehicle, thereby enabling a mounting cavity of the vehicle to be more efficiently designed.

In an aspect of an exemplary embodiment of the present disclosure, an ejector for vaporized fuel gas recirculation devices, which performs an opening/closing operation of allowing a vaporized fuel gas collected into a canister to flow into an intake manifold of an engine when a boosting pressure is generated by driving of a compressor of a turbocharger for vehicles may include a first nozzle component, the vaporized fuel gas flowing from the canister into the first nozzle component, a second nozzle component coupled to a lower portion of the first nozzle component, the boosting pressure and a fluid based on the boosting pressure flowing into the second nozzle, a diffuser coupled to the second nozzle component in a direction opposite to a direction in which the boosting pressure flows in, the vaporized fuel gas being emitted from the diffuser and a reverse flow prevention plate disposed between the first nozzle component and the second nozzle component to prevent the vaporized fuel gas from reversely flowing in a direction toward the first nozzle component. The first nozzle and the diffuser may be rotatably coupled to the second nozzle component.

In some exemplary embodiments, the reverse flow prevention plate may include a base component that forms a body and a plurality of apertures passing through the base component along an edge circumference of the base component. When an intake pressure of the intake manifold is reduced, the base component may move (e.g., raised in a direction) toward the first nozzle component, and a region of the base component except the plurality of apertures may close the first nozzle component.

In other exemplary embodiments, the first nozzle component may include a first nozzle body component provided in a right-angled shape, a first channel port passing through the first nozzle body component along the right-angled shape and a plate movement limitation component limiting movement (e.g., raising) of the reverse flow prevention plate in a direction which is coupled to the second nozzle component in the first nozzle body component. The plurality of apertures may be disposed more outward than a region where the first channel port is provided in an edge of the base component.

Additionally, when the intake pressure of the intake manifold is reduced, the reverse flow prevention plate may move (e.g., be raised in a direction) toward the first nozzle component, and the first channel port may be closed by a center of the base component. The second nozzle component may include a first body component provided in a rectilinear shape, a second channel port passing through the first body component along the rectilinear shape, a second body component protruding in a vertical direction from an outer circumference surface of the first body component, and a third channel port passing through the second body component. A plate positioning component extending in a direction from the outer circumference surface of the first body component to the first nozzle component in the third channel port, the reverse flow prevention plate being positioned in the plate positioning component. The reverse flow prevention plate may be disposed between the plate positioning component and the plate movement limitation component.

In other exemplary embodiments, a first supporting jaw may be disposed in the first body component and may extend in a direction where the diffuser is disposed, from one end of the first body component coupled to the diffuser. A second supporting jaw may be disposed in the second body component and may extend in a direction where the first nozzle component is disposed from one end of the second body component coupled to the first nozzle component. The first supporting jaw may be welding-coupled to one end of the diffuser coupled to the interior of the first supporting jaw, and the second supporting jaw may be welding-coupled to one end of the first nozzle component coupled to the interior of the second supporting jaw. The first supporting jaw may be coupled to the diffuser via laser welding, and the second supporting jaw may be coupled to the first nozzle component via laser welding.

In some exemplary embodiments a first end of the third channel port may communicate with the first channel port, and a second end may communicate with the second channel port. A thickness of the reverse flow prevention component may be less than a distance between the plate positioning component and the plate movement limitation component. The second channel port may be narrowed in a direction opposite to a direction in which the boosting pressure flows in.

Additionally, the diffuser may include a diffuser body component provided in a rectilinear shape, a fourth channel port passing through the diffuser body component along the rectilinear shape, and the vaporized fuel gas which has flowed in through the first nozzle component, being emitted from the diffuser and a coupling component disposed in the compressor of the turbocharger. The fourth channel port may communicate with the first channel port and the third channel port.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION OF EMBODIMENTS

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present disclosure will be described in detail with reference to the accompanying drawings. In this disclosure below, for convenience of description, an ejector according to an exemplary embodiment of the present disclosure will be described as applied to vaporized fuel gas recirculation devices, but is not limited thereto. In other exemplary embodiments, the ejector according to an exemplary embodiment of the present disclosure may be applied to various environments applied to vehicles.

Figure 1:
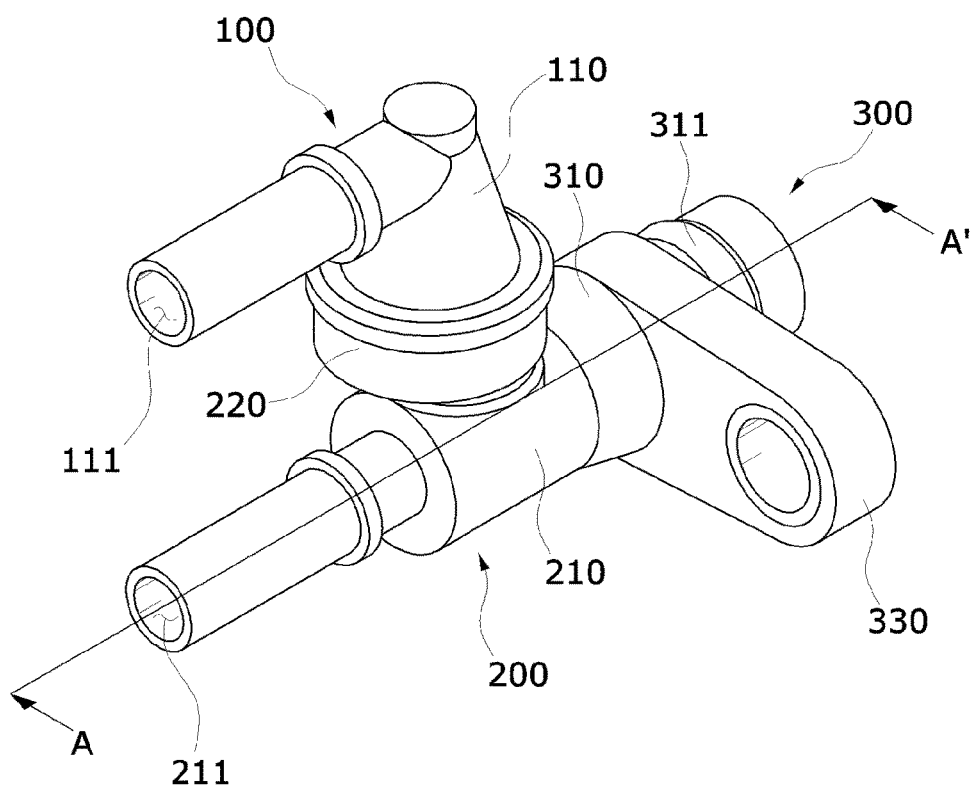
FIG. 1 is an exemplary perspective view illustrating an ejector according to an exemplary embodiment of the present disclosure.
Figure 2:
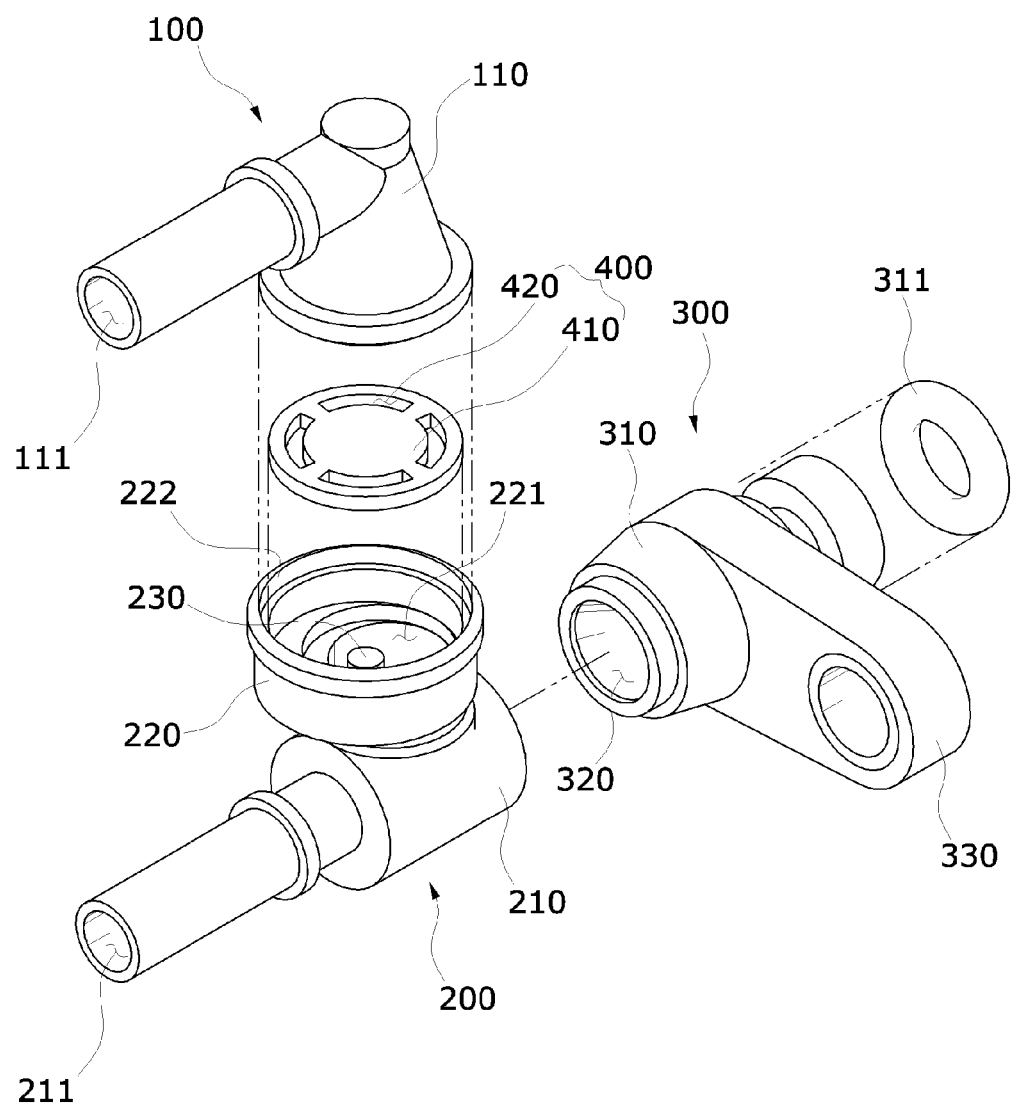
FIG. 2 is an exemplary exploded perspective view of the ejector illustrated in FIG. 1 according to an exemplary embodiment of the present disclosure.
Figure 3:
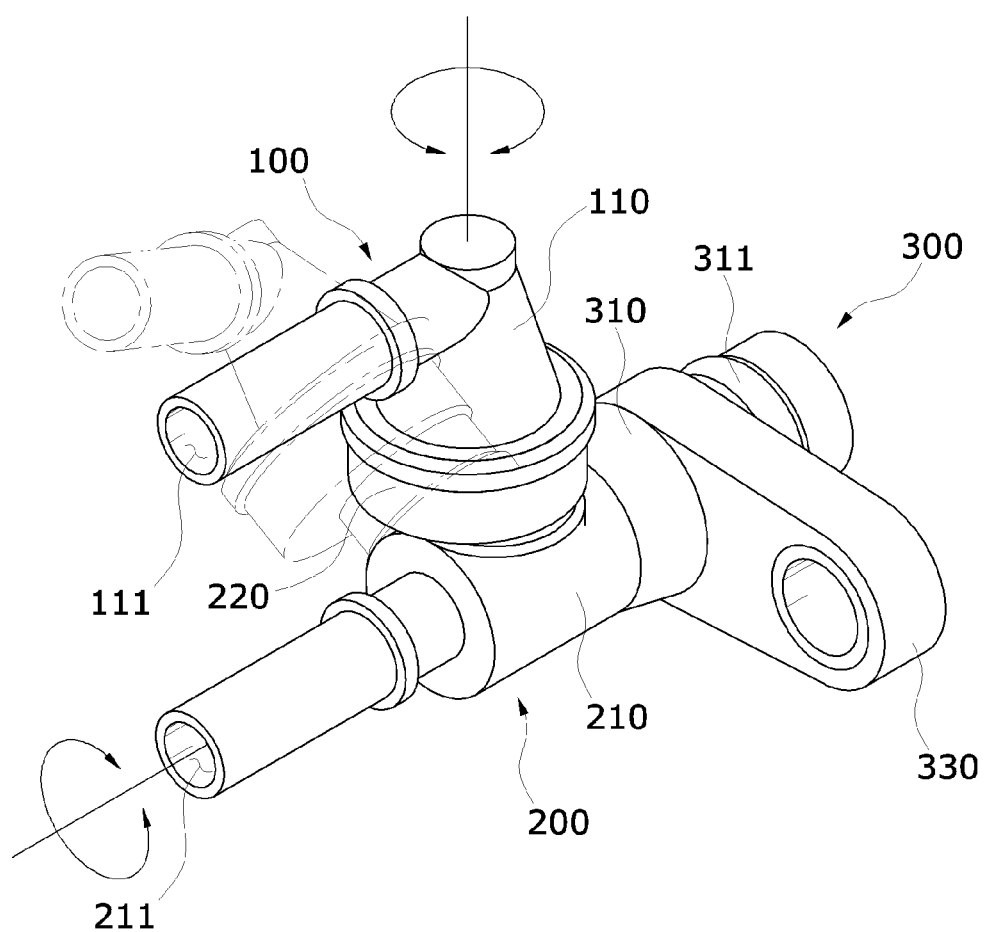
FIG. 3 is an exemplary perspective view illustrating a rotating state of each of elements of the ejector illustrated in FIG. 1 according to an exemplary embodiment of the present disclosure.
Figure 4:
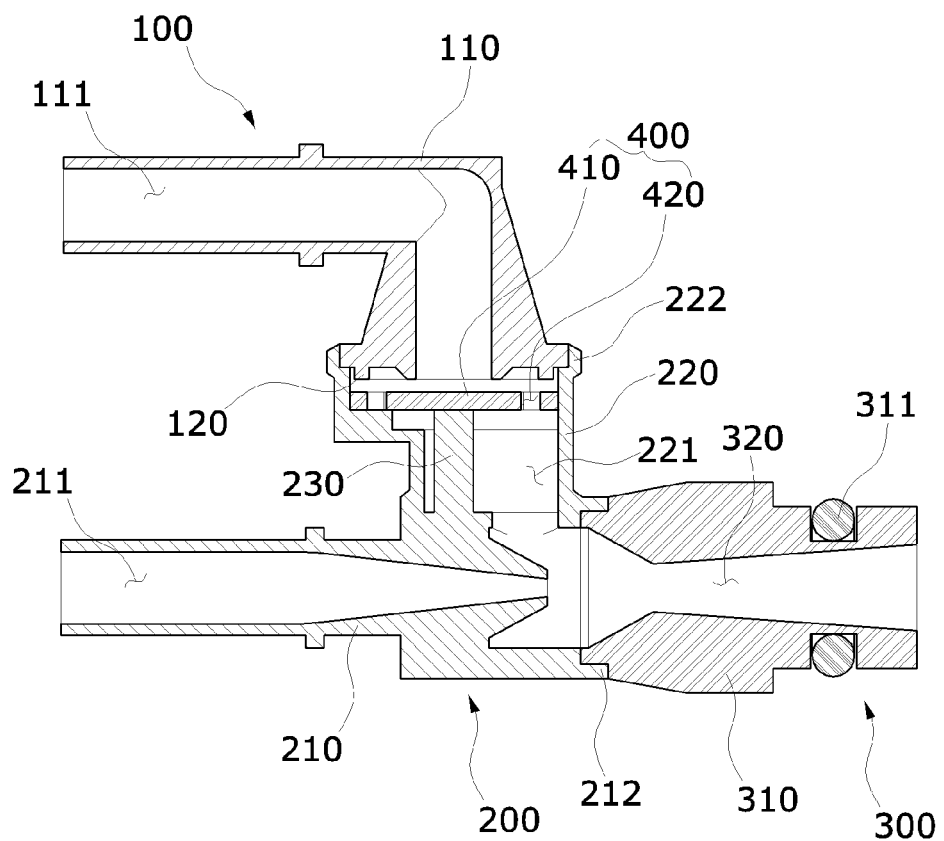
FIG. 4 is an exemplary cross-sectional view taken along line A-A' illustrated in FIG. 1 according to an exemplary embodiment of the present disclosure.

FIG. 1 is an exemplary perspective view illustrating an ejector according to an exemplary embodiment of the present disclosure. FIG. 2 is an exemplary exploded perspective view of the ejector illustrated in FIG. 1. FIG. 3 is an exemplary perspective view illustrating a rotating state of each of elements of the ejector illustrated in FIG. 1. FIG. 4 is an exemplary cross-sectional view taken along line A-A' illustrated in FIG. 1. Referring to FIGS. 1 to 4, when a boosting pressure is generated by driving of a compressor of a turbocharger, the ejector according to an exemplary embodiment of the present disclosure may be opened or closed in order for a vaporized fuel gas collected into a canister to flow into an intake manifold of an engine. The ejector may include a first nozzle component 100, a second nozzle component 200, a diffuser 300, and a reverse flow prevention plate 400.

The first nozzle component 100 may be provided in a right-angled cylindrical shape, and a vaporized fuel gas may flow from a canister into the first nozzle component 100. The first nozzle component 100 may include a first nozzle body component 110 and a plate movement limitation component 120. The first nozzle body component 110 may be provided in a right-angled cylindrical shape and may form a body of the first nozzle component 100. The first nozzle body component 110 may include a first channel port 111 which is provided along a right-angled shape of the first nozzle body component 110 and enables a first end and a second end of the first nozzle body component 110 to communicate with each other in order for the vaporized fuel gas to flow in from the canister. Therefore, the vaporized fuel gas flowing in from the canister may more easily move (e.g., flow) through the first channel port 111.

The plate movement limitation component 120 may be disposed in a direction opposite to a direction (i.e., a direction in which the vaporized fuel gas flows in from the canister in the first nozzle body component 110) which is coupled to the second nozzle component 200 in the first nozzle body component 110. The plate movement limitation component 120 may protrude in a direction in which the second nozzle component 200 is disposed along a periphery of the first channel port 111 from a surface that corresponds to a direction which is coupled to the second nozzle component 200. The plate movement limitation component 120 may prevent the reverse flow prevention plate 400 from being excessively raised.

The second nozzle component 200 may be provided in a cylindrical shape. The second nozzle component 200 may be coupled to the first nozzle component 100 a direction opposite to a direction in which the vaporized fuel gas flows in from the canister. The boosting pressure generated from the compressor of the turbocharger may flow into the second nozzle component 200. The vaporized fuel gas emitted from the canister by the boosting pressure may flow into the second nozzle component 200. The second nozzle component 200 may include a first body component 210, a second body component 220, and a plate positioning component 230. The first body component 210 may be provided in a cylindrical-shaped rectilinear shape and may form a body of the second nozzle component 200

A second channel port 211 and a first supporting jaw 212 may be disposed in the first body component 210. The boosting pressure generated from the compressor of the turbocharger may allow the first end and the second end of the second channel port 211 to communicate with each other along a rectilinear shape of the first body component 210. Therefore, the boosting pressure generated from the compressor of the turbocharger may more easily move through the second channel port 211. The second channel port 211 may have an internal diameter which is narrowed in a direction from a direction, in which the boosting pressure flows to an opposite direction in the first body component 210. In particular, a flow speed of the boosting pressure may increase and the boosting pressure may increase a when the boosting pressure flows out from the second channel port 211 instead of a when the boosting pressure flows into the second channel port 211.

Therefore, the vaporized fuel gas cannot be more easily emitted from the canister due to a low pressure of an engine. However, in the first body component 210 the vaporized fuel gas may flow from the canister into the ejector and may be recirculated to an intake manifold due to a shape of the second channel port 211 of which an internal diameter is narrowed in a direction from a direction in which the boosting pressure flows to an opposite direction. The first supporting jaw 212 may extend by a distance in a direction where the diffuser 300 is disposed from one end of the first supporting jaw 212 coupled to the diffuser 300 in the first body component 210. Moreover, when the diffuser 300 is coupled to the first body component 210 the first supporting jaw 212 may more easily guide a mounted position of the diffuser 300.

The second body component 220 may form a body of the second nozzle component 200 along with the first body 210. The second body component 200 may be provided in a cylindrical-shaped rectilinear shape and may extend in a vertical direction from an outer circumference surface of the first body 210. A third channel port 221 and a second supporting jaw 222 may be disposed in the second body component 220. A first end and a second end of the third channel port 221 may communicate with each other along a rectilinear shape of the second body 220 to enable the vaporized fuel gas that flows in from the first channel port 111 of the first nozzle component 100 to flow into the third channel port 221. Moreover, the third channel port 221 may communicate with the second channel port 211 to move the vaporized fuel gas that flows in from the first channel port 111 to the diffuser 300.

In particular, a portion of a region where the first channel port 111 intersects the third channel port 221 may pass through an outer circumference surface of the first body component 210 from which the second body component 220 protrudes and the second channel port 211 may communicate with the third channel port 221. Therefore, the first end of the third channel port 221 may communicate with the first channel port 111, and the second end may communicate with the second channel port 211. Therefore, the vaporized fuel gas flowing in from the first channel port 111 may more easily move to the diffuser 300 via the third channel port 221. The second supporting jaw 222 may extend by a distance in a direction in which the first nozzle component 100 is disposed from one end of the second supporting jaw 222 coupled to the first nozzle component 100 in the second body component 220 and may be disposed to surround the outer circumference surface of the first nozzle component 100. Moreover, an internal diameter of the second supporting jaw 222 may be adjusted to a similar size as that of an external diameter of the first nozzle component 100. Therefore, when the first nozzle component 100 is coupled to the second nozzle component 220, the second supporting jaw 222 may more easily guide a mounted position of the first nozzle component 100.

The reverse flow prevention plate 400 may be disposed in the plate positioning component 230. The plate positioning component 230 may be provided in a cylindrical shape. The plate positioning component 230 may extend in a direction toward the first nozzle component 100 from a region other than a region where the second channel port 211 communicates with the third channel port 221 of an outer circumference surface of the second body component 220 in the third channel port 221. Therefore, the reverse flow prevention plate 400 disposed within the third channel port 221 may be more easily positioned within the third channel port 221.

The diffuser 300 may be coupled to the second nozzle component 200 in a direction opposite to a direction in which the boosting pressure flows in. The vaporized fuel gas flowing in from the first nozzle component 100 may be emitted to the diffuser 300. The diffuser 300 may include a diffuser body component 310 and a coupling component 330. The diffuser body component 310 may be provided in a cylindrical-shaped rectilinear shape and may form a body of the diffuser 300. The diffuser body component 310 may be equipped in the compressor of the turbocharger, and an O-ring 311 may be coupled to an outer circumference surface of the diffuser body component 310. Therefore, when the vaporized fuel gas flowing in from the diffuser body component 310 moves to the intake manifold via the compressor of the turbocharger, the diffuser body component 310 may more easily prevent the vaporized fuel gas from being leaked to a cavity between the diffuser body component 310 and the compressor of the turbocharger.

A fourth channel port 320 which enables the first end and the second end to communicate with each other may be provided along a rectilinear shape in the diffuser body component 310 to allow the vaporized fuel gas flowing in from the first nozzle component 100 to flow in. The vaporized fuel gas which flows in from the first channel port 111 and moves to the third channel port 221 and the boosting pressure of the compressor of the turbocharger flowing through the second channel port 211 may flow into the fourth channel port 320. In other words, the fourth channel port 320 may communicate with the first channel port 111 that communicates with the third channel port 221.

Moreover, an internal diameter of an inflow port into which the boosting pressure and the vaporized fuel gas flow in the fourth channel port 320 may be greater than an internal diameter of an outflow port through which the boosting pressure flows out in the first channel port 111. In particular, when the boosting pressure which flows into the second channel port 211 at a high pressure flows out to the inflow port of the fourth channel port 320 and an inflow pressure is rapidly reduced, the vaporized fuel gas of the canister may flow into the second channel port 211 of the first nozzle component 100. Therefore, the vaporized fuel gas may not be easily emitted from the canister due to a low pressure of the engine. However, when the boosting pressure generated by driving of the compressor of the turbocharger flows into the second channel port 211, the vaporized fuel gas may flow from the canister into the first channel port 111 and may be more easily emitted to the outside of the ejector through the fourth channel port 320 via the third channel port 221. Therefore, since the first channel port 111 to the fourth channel port 320 communicate with one another, the vaporized fuel gas may flow from the canister to the ejector and may be recirculated to the intake manifold.

The coupling component 330 may be disposed on an outer circumference surface of the diffuser body component 310 and may be equipped in the compressor of the turbocharger. The coupling component 330 may enable the ejector to be more easily coupled to the outside of the turbocharger and may allow the coupling to be made in a screw coupling manner (or the like). Therefore, a fixing aperture may be provided in the coupling component 330 in a direction parallel to the fourth channel port 320.

Since each of the first and second nozzle parts 100 and 200 and the diffuser 300 are individually provided as illustrated in FIGS. 2 and 3, by rotating the first nozzle component 100 and the diffuser 300 from the second nozzle component 200, coupling may be made at various angles suitable for a layout environment of a vehicle engine compartment. Moreover, a positioned angle of the ejector may be determined based on the layout environment of the vehicle engine compartment and the ejector may rotate, and then, coupling may be made through laser welding in a process of fixing the first and second nozzle parts 100 and 200 and the diffuser 300. In particular, the first supporting jaw 212 may be welded to an outer circumference surface of the second supporting jaw 222. Therefore, the first nozzle component 100 coupled to the first body component 210 of the second nozzle component 200 and the diffuser 300 coupled to the second body component 220 of the second nozzle component 200 may be fixed to the second nozzle component 200.

The reverse flow prevention plate 100 may be disposed between the first nozzle component 100 and the second nozzle component 200 to prevent the vaporized fuel gas from reversely flowing in a direction toward the first nozzle component 100, and may perform a function of a check valve. In particular, the reverse flow prevention plate 400 may be disposed in the second channel port 211 and may be disposed between the plate movement limitation component 120 of the first nozzle component 100 and the plate positioning component 230 of the second nozzle component 200. Moreover, a thickness of the reverse flow prevention plate 400 may be set less than a distance between the plate movement limitation component 120 and the plate positioning component 230. Therefore, the reverse flow prevention plate 400 may move to the plate movement limitation component 120 according to a flow of the vaporized fuel gas flowing in from the canister to prevent a reverse flow of the vaporized fuel gas, or may move to the plate positioning component 230 to move the vaporized fuel gas to the third channel port 221.

As described above, when the reverse flow prevention plate 400 having a function of the check valve is provided within the ejector, the number of elements configuring a vaporized fuel gas recirculation device may be reduced. Accordingly, a productivity of the vaporized fuel gas recirculation device may increase the manufacturing cost may be reduced, and the cavity of the engine compartment may be more efficiently designed.

The reverse flow prevention plate 400 may include a base component 410 and an aperture 420. The base component 410 may be provided in a disc shape and may form a body of the reverse flow prevention plate 400. An external diameter of the base component 410 may have a similar size as that of an internal diameter of the third channel port 221, and the base component 410 may be formed of rubber. Therefore, the base component 410 may more easily prevent the vaporized fuel gas flowing in from the first nozzle component 100 from being leaked to a cavity between the reverse flow prevention plate 400 and the third channel port 221. The aperture 420 may be provided in plurality along an edge circumference of the base component 410 and may be disposed more outward than a region where the first channel port 111 is provided in an edge of the base component 410. In particular, the external diameter of the base component 410 may have the same size as that of the internal diameter of the third channel port 221. However, the vaporized fuel gas flowing in through the first channel port 111 may more easily flow to the third channel port 221 through the aperture 420.

Moreover, the aperture 420 may be provided more outward than the region where the first channel port 111 is provided, in the edge of the base component 410. Accordingly, when an intake pressure of the intake manifold is reduced and the reverse flow prevention plate 400 is moved (e.g., raised) in a direction toward the first nozzle component 100, the other region (i.e., a center of the base component 410) of the base component 410 except the aperture 420 may more easily close the first channel port 111.

Figure 5A:
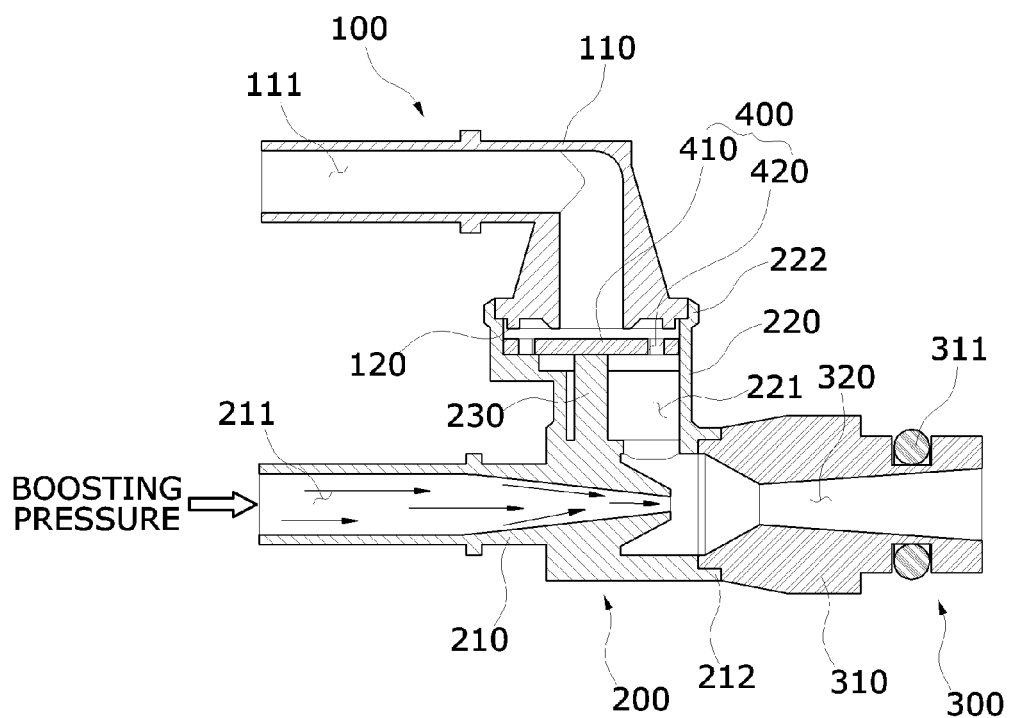
FIGS. 5A to 5C are exemplary operation views illustrating an operating state of the ejector according to an exemplary embodiment of the present disclosure.
Figure 5B:
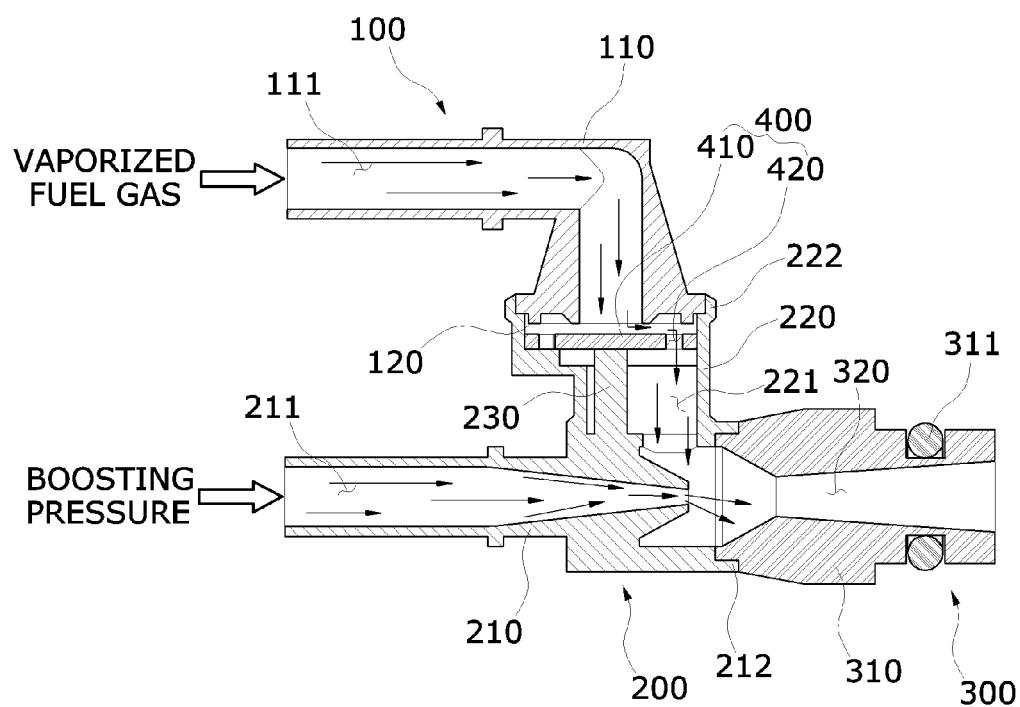
Figure 5C:
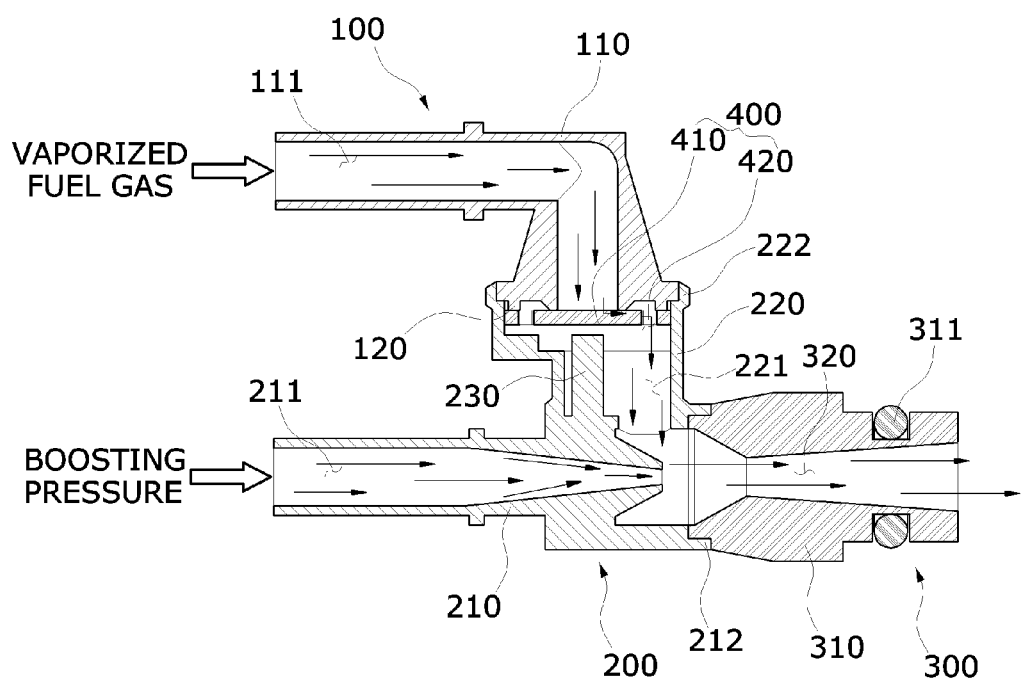
Figure 6:
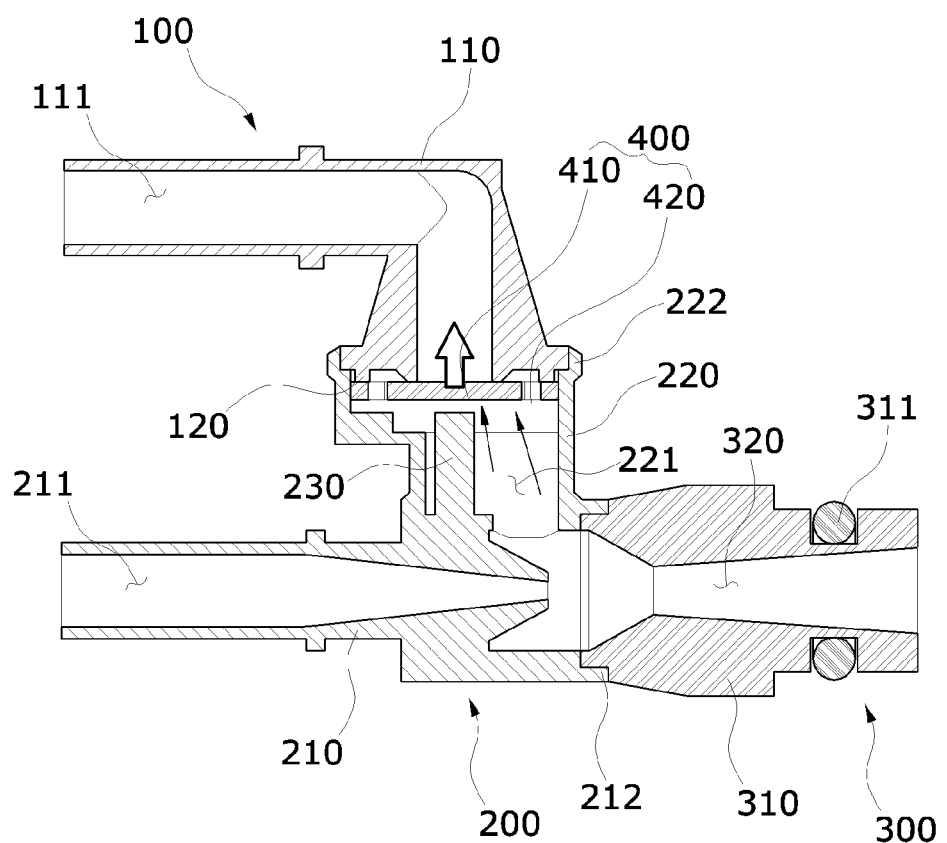
FIG. 6 is an exemplary operation view illustrating an operating state of a reverse flow prevention plate according to an exemplary embodiment of the present disclosure.

Hereinafter, an operating state of the ejector for vaporized fuel gas recirculation devices according to an exemplary embodiment of the present disclosure will be described. FIGS. 5A to 5C are exemplary operation views illustrating an operating state of the ejector according to an exemplary embodiment of the present disclosure. FIG. 6 is an exemplary operation view illustrating an operating state of a reverse flow prevention plate according to an exemplary embodiment of the present disclosure. First, in the vaporized fuel gas recirculation device, when the vaporized fuel gas collected into the canister cannot flow into the intake manifold due to the low pressure of the engine the compressor of the turbocharger may generate the boosting pressure.

As illustrated in FIG. 5A, when the boosting pressure is generated from the compressor of the turocharger the boosting pressure may flow into the ejector via the second channel port 211. Accordingly, an inner circumference surface of the second channel port 211 may be narrowed in a direction from the inflow port to a direction opposite to the inflow port. Therefore, a flow speed of the boosting pressure may increase and the boosting pressure may increase when the boosting pressure flows out from the second channel port 211, instead of when the boosting pressure flows into the second channel port 211.

When the boosting pressure flows in through the second channel port 211 and the boosting pressure reaches the inflow port of the fourth channel port 320 from the second channel port 211, since the internal diameter of the inflow port is greater than the internal diameter of the outflow port a pressure of the boosting pressure may be reduced. Simultaneously, as illustrated in FIG. 5B, the vaporized fuel gas may flow from the canister into the ejector. Moreover, as illustrated in FIG. 5C, the vaporized fuel gas flowing into the fourth channel port 320 may be emitted to the exterior of the fourth channel port 320. The vaporized fuel gas emitted from the ejector may be recirculated to the intake manifold.

When the intake pressure of the intake manifold is reduced and thus the vaporized fuel gas or the boosting pressure reversely flows to the first channel port 111, as illustrated in FIG. 6, the reverse flow prevention plate 400 disposed between the plate movement limitation component 120 and the plate positioning component 230 may be moved (e.g., raised) in a direction toward the plate movement limitation component 120. Additionally, a center of the reverse flow prevention plate 400 may close the first channel port 111. Therefore, when the intake pressure of the intake manifold is reduced and the vaporized fuel gas or the boosting pressure reversely flows to the first channel port 111, and a reverse flow of the vaporized fuel gas or the boosting pressure may be more efficiently prevented by the reverse flow prevention plate 400.

As described above, in the ejector for vaporized fuel gas recirculation devices according to the exemplary embodiments of the present disclosure, since each of the first and second nozzle parts 100 and 200 and the diffuser 300 are individually provided, by rotating the first nozzle component 100 and the diffuser 300 from the second nozzle component 200, coupling may be made at various angles to suitable for the layout environment of the vehicle engine compartment. Moreover, when the reverse flow prevention plate 400 having a function of the check valve is disposed within the ejector, the number of elements configuring the vaporized fuel gas recirculation device may be reduced. Accordingly, a productivity of the vaporized fuel gas recirculation device may increase and the manufacturing cost may be reduced and the cavity of the engine compartment may be more efficiently designed.

Moreover, the fourth channel port 320 may communicate with the first channel port 111 communicating with the third channel port 321. When the boosting pressure flows into the second channel port 211 due to driving of the compressor of the turbocharger, the vaporized fuel gas which may not be easily emitted from the canister due to the low boosting pressure flows from the canister into the first channel port 111 and may be more easily emitted to the exterior of the ejector through the fourth channel port 320 via the third channel port 221. Therefore, when the first channel port 111 to the fourth channel port 320 communicate with one another, the vaporized fuel gas may flow from the canister to the ejector and may be recirculated to the intake manifold. Furthermore, when a thickness of the reverse flow prevention plate 400 is set less than a distance between the plate movement limitation component 120 and the plate positioning component 230, the reverse flow prevention plate 400 may move to the plate movement limitation component 120 based on a flow of the vaporized fuel gas flowing in from the canister to prevent a reverse flow of the vaporized fuel gas, or may move to the plate positioning component 230 to move the vaporized fuel gas to the third channel port 221.

Moreover, when a plurality of apertures are provided more outward than a region where the first channel port 420 is provided in the edge of the base component 410 along the edge circumference of the base component 410, although the external diameter of the base component 410 has a similar size as that of the internal diameter of the third channel port 221, the vaporized fuel gas flowing in through the first channel port 111 may more easily move to the third channel port 221 through the aperture 420. Additionally, the aperture 420 may be provided more outward than the region where the first channel port 111 is provided in the edge of the base component 410. Accordingly, when the intake pressure of the intake manifold is reduced and the reverse flow prevention plate 400 may move (e.g., be raised) in a direction toward the first nozzle component 111 and the other region (i.e., the center of the base component 410) of the base component 410 except the aperture 420 may more easily close the first channel port 111.

In the ejector for vaporized fuel gas recirculation devices according to the exemplary embodiments of the present disclosure, when each of the first and second nozzle parts and the diffuser are individually provided by rotating the first nozzle component and the diffuser from the second nozzle component coupling may be made at various angles to be suitable for a layout environment of a vehicle engine compartment. When the reverse flow prevention plate having a function of the check valve is disposed within the ejector the number of elements configuring the vaporized fuel gas recirculation device may be reduced. Accordingly, productivity of the vaporized fuel gas recirculation device may increase, the manufacturing cost may be reduced, and the cavity of the engine compartment may be more efficiently designed.

The fourth channel port may communicate with the first channel port communicating with the third channel port. Accordingly, when the boosting pressure flows into the second channel port due to driving of the compressor of the turbocharger, the vaporized fuel gas which is not easily emitted from the canister due to the low boosting pressure flows from the canister into the first channel port and may be more easily emitted to the exterior of the ejector through the fourth channel port via the third channel port. Therefore, when the first to fourth channel ports communicate with one another, the vaporized fuel gas may flow from the canister to the ejector and may be recirculated to the intake manifold.

In particular, when a thickness of the reverse flow prevention plate is less than a distance between the plate movement limitation component and the plate positioning component, the reverse flow prevention plate may move to the plate movement limitation component according to a flow of the vaporized fuel gas flowing in from the canister to prevent a reverse flow of the vaporized fuel gas, or may move to the plate positioning component to move the vaporized fuel gas to the third channel port.

Additionally, when a plurality of apertures are disposed more outward than a region where the first channel port is provided in the edge of the base component along the edge circumference of the base component, although the external diameter of the base component has a similar size as that of the internal diameter of the third channel port, the vaporized fuel gas flowing in through the first channel port may more easily move to the third channel port through the aperture. Additionally, the aperture may be disposed more outward than the region where the first channel port is provided in the edge of the base component. Accordingly, when the intake pressure in the intake manifold is reduced and the reverse flow prevention plate is raised in a direction toward the first nozzle component, the other region (i.e., the center of the base component) of the base component except the aperture may more easily close the first channel port of the first nozzle component.

A number of exemplary embodiments have been described above. Nevertheless, it will be understood that various modifications may be made. For example, suitable results may be achieved when the described techniques are performed in a different order and/or when components in a described system, architecture, device, or circuit are combined in a different manner and/or replaced or supplemented by other components or their equivalents. Accordingly, other implementations are within the scope of the following claims.

What is claimed is:

1. An ejector for vaporized fuel gas recirculation devices for performing an opening/closing operation of allowing a vaporized fuel gas collected into a canister to flow into an intake manifold of an engine when a boosting pressure is generated by driving of a compressor of a turbocharger for vehicles, comprising:
    a first nozzle component, having an inlet and an outlet that are perpendicular to each other, and a first mating surface formed at the outlet of the first nozzle component;
    a second nozzle component, having a first inlet, a second inlet, an outlet, a second mating surface formed at the second inlet of the second nozzle component, and a third mating surface formed at the outlet of the second nozzle component, wherein the second mating surface is coupled to the first mating surface of the first nozzle component;
    a diffuser, having an inlet and an outlet, and a fourth mating surface formed at the inlet of the diffuser, wherein the fourth mating surface is coupled to the third mating surface of the second nozzle component; and
    a reverse flow prevention plate disposed between the first nozzle component and the second nozzle component to prevent the vaporized fuel gas from reversely flowing in a direction toward the first nozzle component,
    wherein the first nozzle component and the diffuser are positioned by rotating at a desired angle with respect to the second nozzle component and then welded to the second nozzle component, and
    wherein the reverse flow prevention plate comprises:
        a base component having a disc-shaped outer circumference; and
        a plurality of apertures formed within the outer circumference of the base component, wherein the reverse flow prevention plate is moved toward the first nozzle component, and a central region of the base component closes the outlet of the first nozzle component when an intake pressure of the intake manifold is reduced.

2. The ejector of claim 1, wherein the first nozzle component comprises:
    a first nozzle body component provided in a right-angled shape, a first channel port passing through the first nozzle body component along the right-angled shape; and
    a plate movement limitation component limiting movement of the reverse flow prevention plate in a direction toward the first nozzle component, and the plurality of apertures are disposed in an edge of the base component more outward than a region where the first channel port is provided.

3. The ejector of claim 2, wherein when the intake pressure of the intake manifold is reduced, the reverse flow prevention plate moves toward the first nozzle component, and the first channel port is closed by a center of the base component.

4. The ejector of claim 2, wherein the second nozzle component comprises:
    a first body component provided in a rectilinear shape, a second channel port passing through the first body component along the rectilinear shape;
    a second body component protruding in a vertical direction from an outer circumference surface of the first body component, a third channel port passing through the second body component; and
    a plate positioning component extending in a direction from the outer circumference surface of the first body component to the first nozzle component in the third channel port, the reverse flow prevention plate being disposed in the plate positioning component, and the reverse flow prevention plate is disposed between the plate positioning component and the plate movement limitation component.

5. The ejector of claim 4, wherein a first supporting jaw is disposed in the first body component and extends in a direction, where the diffuser is disposed, from one end of the first body component coupled to the diffuser, and
    wherein a second supporting jaw is disposed in the second body component and extends in a direction, where the first nozzle component is disposed, from one end of the second body component coupled to the first nozzle component, the first supporting jaw is welding-coupled to one end of the diffuser coupled to the interior of the first supporting jaw, and the second supporting jaw is welding-coupled to one end of the first nozzle component coupled to the interior of the second supporting jaw.

6. The ejector of claim 5, wherein the first supporting jaw is coupled to the diffuser via laser welding, and the second supporting jaw is coupled to the first nozzle component via laser welding.

7. The ejector of claim 4, wherein a first end of the third channel port communicates with the first channel port, and a second end communicates with the second channel port.

8. The ejector of claim 4, wherein a thickness of the reverse flow prevention component is less than a distance between the plate positioning component and the plate movement limitation component.

9. The ejector of claim 4, wherein the second channel port is narrowed in a direction opposite to a direction in which the boosting pressure flows in.

10. The ejector of claim 4, wherein the diffuser comprises:
a diffuser body component provided in a rectilinear shape, a fourth channel port passing through the diffuser body component along the rectilinear shape, and the vaporized fuel gas, which has flowed in through the first nozzle component, being emitted from the diffuser; and
a coupling component disposed in the compressor of the turbocharger, and the fourth channel port communicates with the first channel port and the third channel port.

11. An ejector for a vaporized fuel gas recirculation device, comprising:
a first nozzle component, having an inlet and an outlet that are perpendicular to each other, and a first mating surface formed at the outlet of the first nozzle component;
a second nozzle component, having a first inlet, a second inlet, an outlet, a second mating surface formed at the second inlet of the second nozzle component, and a third mating surface formed at the outlet of the second nozzle component, wherein the second mating surface is configured to be coupled to the first mating surface of the first nozzle component;
a diffuser, having an inlet and an outlet, and a fourth mating surface formed at the inlet of the diffuser, wherein the fourth mating surface is configured to be coupled to the third mating surface of the second nozzle component; and
a reverse flow prevention plate disposed between the first nozzle component and the second nozzle component to prevent a gas from reversely flowing in a direction toward the first nozzle component,
wherein each of the first mating surface, the second mating surface, the third mating surface, and the fourth mating surface is axisymmetric, and
wherein the reverse flow prevention plate comprises:
a base component having a disc-shaped outer circumference; and
a plurality of apertures formed within the outer circumference of the base component, wherein the reverse flow prevention plate is moved toward the first nozzle component, and a central region of the base component closes the outlet of the first nozzle component when an intake pressure of the intake manifold is reduced.

12. The ejector of claim 11, wherein the first nozzle component and the diffuser are rotatable with respect to the second nozzle component.

* * * * *